No. 627,291. Patented June 20, 1899.
W. L. BLISS.
DRIVING MECHANISM FOR DYNAMOS ON CAR TRUCKS.
(Application filed Mar. 2, 1898.)
(No Model.)
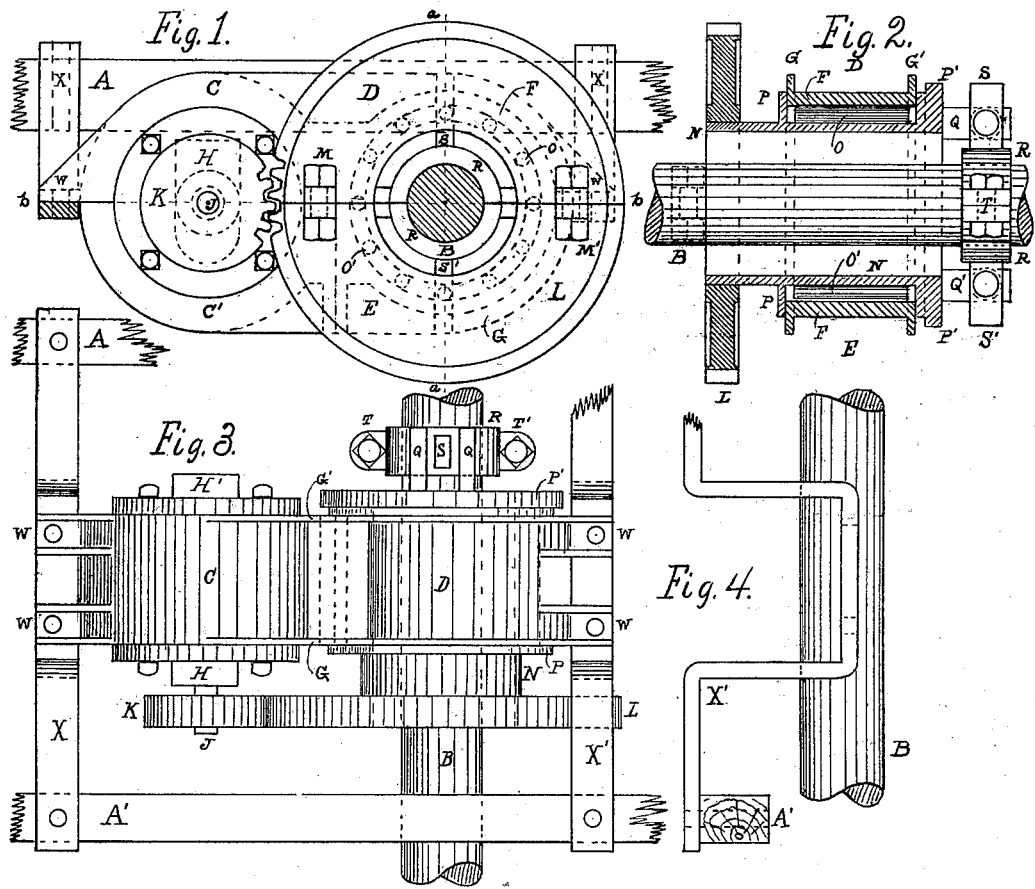
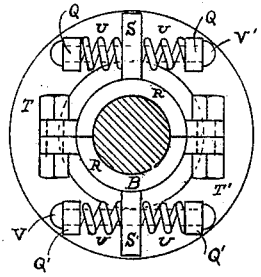
WITNESSES:
John Bliss
John L. Bliss
INVENTOR
William L. Bliss
THE NORRIS PETERS CO., PHOTO-LITHO., WASHINGTON, D. C.

United States Patent Office.

WILLIAM LORD BLISS, OF NEW YORK, N. Y.

DRIVING MECHANISM FOR DYNAMOS ON CAR-TRUCKS.

SPECIFICATION forming part of Letters Patent No. 627,291, dated June 20, 1899.

Application filed March 2, 1898. Serial No. 672,297. (No model.)

*To all whom it may concern:*

Be it known that I, WILLIAM LORD BLISS, a citizen of the United States, and a resident of New York, (Brooklyn,) in the county of Kings and State of New York, have invented certain new and useful Improvements in Driving Mechanism for Dynamos on Car-Trucks, of which the following is a specification.

The object of this invention is to provide a means whereby the rotative motion of an axle or shaft which is either out of true or runs out of true or which is subject to vibration lateral or longitudinal motions may be utilized for driving machinery which requires perfectly smooth and true rotation for its operation.

An immediate application of my device is in the driving of a dynamo by means of a car-axle, said dynamo being suitably mounted on the truck-frame for that purpose. In this instance the car-axle is generally out of true, rough, unfinished, and tapered, and present railroad practice prohibits all devices which contemplate turning or in any way tooling or machining said axles. It is also undesirable to employ devices which necessitate the use of set-screws, roughened clamps, &c., in applying to the axles false sleeves having previously had trued spaces turned upon them for the reception of gear-wheels and supporting-bearings. Such devices require skilled labor in truing them in place, and even then such trueness is only approximate. My device eliminates all these objections, no skilled labor being necessary and no truing in place being required; and, further, such axles are subject to severe shocks and vibrations and have considerable free motion relative to the frames of the trucks.

My invention enables a dynamo to be mounted on the truck-frame, thereby utilizing the cushioning action of the car-springs to relieve the dynamo from vibration and shock, dispenses with carrying any portion of the weight of the dynamo upon the axle, as in present street-railway-motor mountings and those mountings using false sleeves bolted to the axle, does not require the axle to be finished to run true, and avoids the necessity of maintaining parallelism between the car-axle and the dynamo-shaft. The motion is communicated from the axle to the wheel which drives the armature pinion or pulley through a flexible driving connection, which transmits only the rotative component of the axle motion, all other components being lost. I prefer to use in practice, on account of its simplicity, a dog clamped upon the axle, which dog does not require a special seat on the axle for its reception, but which may be clamped directly upon the unfinished rough tapered axle, and no special care need be exercised to make it run true, it being quite as effective when out of true as when nicely adjusted.

My device is not of necessity confined to driving a dynamo from a car-axle, but may be used in the shop, factory, or any situation wherein the rotation of an untrue shaft may be made available without turning or otherwise truing the said shaft or without turning or truing an attachment carried by said shaft for the purpose of utilizing its rotary motion.

I will first describe my invention in detail with reference to the accompanying drawings and afterward point out its novelty in the claims.

Figure 1 represents a side elevation of a dynamo and its driving mechanism as applied to a car-truck, only so much of the truck being represented as is necessary to illustrate the invention. Fig. 2 is a sectional view of the driving mechanism, taken through the line *a a* of Fig. 1. Fig. 3 is a plan view of said dynamo and its driving mechanism. Fig. 4 represents one of the nose-bars, which rest upon the truck-frame and support the dynamo and its driving mechanism; and Fig. 5 illustrates a desirable method of transmitting the motion of the rotating dog, which is clamped upon the axle, to the driving-lugs upon the hollow shaft.

Similar parts in all the figures are represented by the same letters.

A A' designate the frame of a car-truck, and B designates one of the axles thereof, which may be constructed and combined as in ordinary railway-cars.

C C' is the dynamo, which may be of any known or suitable kind, but which is preferably of the iron-clad internal-pole type. In the drawings the dynamo is represented as circular in form and provided with two extension-pieces D and E, which form a hollow pillow-block. The dynamo is divided in a horizontal plane along the line b b, the upper half c being cast or made integral with the extension-piece D, while the lower half c' is separate from the extension-piece E. This particular construction is not essential, but for many mechanical reasons it is very convenient.

The extension-piece D may be made separately and bolted to the upper half of the dynamo C; but the method described and shown is simpler and better. The extension-pieces D and E form a pillow-block or bracket, consisting of the hollow cylindrical part F and the ribs G G'. This particular construction is not necessary; but the ribs G G' carry out the contour of the dynamo and add great strength to the cylindrical part F, thus making a neat and substantial design. Of course the parts C C', D, and E are to be bolted or fastened together in any suitable manner well known in the art.

Suitable bearings H H' are provided in the side casings of the dynamo for the reception of the armature-shaft J, which is shown carrying the tooth-pinion K. The armature proper is mounted on the shaft J and is inside of the dynamo; but as it forms no essential part of this invention it is not shown. The toothed driving-gear L is of ordinary construction, being made into symmetrical halves fastened together by the bolts M M'. The gear L is mounted on a hollow shaft N, which is turned true on its outer surface and finds a bearing on the inside surface of the pillow-block F, which is similarly turned to a true bearing-surface.

A set of antifriction-rollers O O' are shown between the hollow shaft N and the inside surface of the pillow-block F. These rollers may be of any well-known construction and may or may not be mounted in a guiding yoke or cage. Spherical balls might be similarly employed to reduce the friction of the shaft N in these bearings in any of the well-known ways. A plain solid bearing might be used without rollers or balls; but it is probably preferable to use some kind of an antifriction-bearing. The hollow shaft N is also divided into halves and would in practice be suitably bolted together. The hollow shaft N has shoulders or collars P P' upon its outer surface, which serve to keep it confined to the pillow-block and absorb all end thrust. The collar P' is made preferably heavier than the collar P and carries upon its face one or more driving-lugs Q Q'. The hollow shaft N, the collars P P', and the lugs Q Q' would in practice be cast integrally and finished. The inside of the shaft N need not be finished, since it is not in contact with anything.

The hollow shaft N surrounds the axle B and is spaced therefrom, so that a slight eccentricity in the axle B and shaft N is of no moment whatever. The clearance between the axle B and the shaft N is made large enough to allow of great vertical and horizontal motion of the axle B without disturbing the shaft N. The advantage of this construction is that the vibration, pounding, and shocks which originate in the car wheels and axles are not communicated to the dynamo C C'.

The flexible connection for communicating the rotary motion of the axle B to the hollow shaft N is represented in the accompanying drawings as a split dog R, consisting of one or more arms S S', clamped upon the axle by means of bolts T T', said arms being extended between the pairs of lugs Q Q'. It is desirable to have the lugs Q Q' quite long in the direction of the axle B and the space between the dog R and the collar P' considerable, so that a large end play in the axle B may be accommodated without disengaging the lugs Q Q' and the arms S S'.

In order to insure even driving and equal pressures on the lugs Q Q', I have introduced springs U between the lugs Q Q' and the arms S S'. Suitable rods or confining-bolts V V' prevent the displacement of the said springs U.

It is obvious that the bolts V V' must not fit tightly in the lugs Q Q' and arms S S', but must admit of considerable play.

The so-called "dog" R, having the arms S S', may be modified very greatly without departing from the spirit and scope of my invention. In fact, the dog may be dispensed with and any flexible connection between the axle B and the hollow shaft N substituted therefor, it being necessary only that the said flexible connection shall communicate the rotative motion of the axle B to the shaft N, or vice versa, without communicating any other kind of motion.

Only ordinary care need be exercised in mounting the dog on the axle, as it is quite as effective when out of true. The same is true in regard to mounting the dynamo and pillow-block on the car-truck, an approximate centering of the axle B and the shaft N being all that is necessary.

The dynamo and pillow-block are supported by lugs or noses W W', resting on the nose-bar X X'. A side view of the nose-bars is shown in Fig. 4, indicating their relative position to the axle B.

It is evident that the dynamo might be made entirely separate from the pillow-block D E, the latter only being mounted on the truck. It would also be possible to drive the dynamo from the hollow shaft by any suitable means—such as belting, sprocket-chains, friction-gearing, &c.—and I do not wish it understood that I confine myself to a gear connection between the said parts, as shown in the drawings.

The pillow-block, hollow shaft, and flexible connection between the shaft and axle provide a means whereby smooth and even running may be obtained from an untrue vibrating axle.

By making the lower half of the pillow-block E separate it may be removed without interfering with the rest of the structure, thus enabling the axle to be removed, and also the lower half of the dynamo C' being separate it may be removed and the interior of the dynamo inspected. The upper half of the dynamo C and the upper half of the pillow-block D being supported by the nose-bars X X' remain undisturbed.

While I have represented the dog R as clamped upon the axle B, the said dog might be forged or cast solid with the said axle or be fastened thereon by any suitable means.

What I claim is—

1. In combination, a truck-frame, an axle, a hollow shaft mounted to rotate in the truck-frame, said hollow shaft surrounding and spaced from the said axle and a flexible driving connection between the said axle and hollow shaft, substantially as set forth.

2. In combination, a dynamo, a truck-frame, an axle, a hollow shaft mounted to rotate in the truck-frame, said hollow shaft surrounding and spaced from the said axle, a driving connection between the hollow shaft and the dynamo and a flexible driving connection between the axle and the hollow shaft, substantially as set forth.

3. In combination, a dynamo, a truck-frame, a pillow-block supported by the truck-frame, a hollow shaft mounted to rotate therein, a driving connection between the hollow shaft and the dynamo, an axle extending through the hollow shaft and spaced therefrom and a flexible driving connection between the axle and shaft, substantially as set forth.

4. The combination with a pillow-block and a hollow shaft mounted to rotate therein, of an axle extending through the hollow shaft and spaced therefrom and a flexible driving connection between the axle and shaft, substantially as set forth.

5. The combination of a hollow pillow-block, a hollow shaft mounted to rotate in said pillow-block, a driving-axle extending through said hollow shaft, a clearance between said driving-axle and said hallow shaft permitting eccentric motion of said driving-axle within said hollow shaft, a dog mounted upon or forming a part of said driving-axle and adapted to engage said hollow shaft whereby the rotation of said driving-axle is communicated through said dog to said hollow shaft, substantially as herein described.

6. The combination of a hollow pillow-block, a hollow shaft mounted to rotate in said pillow-block, an antifriction-bearing between said hollow shaft and said pillow-block, a driving-axle extending through said hollow shaft, a clearance between said driving-axle and said hollow shaft permitting eccentric motion of said driving-axle within said hollow shaft, a dog mounted upon or forming a part of said driving-axle and adapted to engage said hollow shaft whereby the rotation of said driving-axle is communicated through said dog to said hollow shaft, substantially as herein described.

7. The combination of a hollow pillow-block, a hollow shaft mounted to rotate in said pillow-block, a driving-axle extending through said hollow shaft, a clearance between said driving-axle and said hollow shaft permitting eccentric motion of said driving-axle within said hollow shaft, a dog mounted upon or forming a part of said driving-axle and adapted to engage said hollow shaft and one or more springs interposed between said dog and the point of engagement of said dog with said hollow shaft whereby the rotation of said driving-axle is communicated through said dog and said springs to said hollow shaft, substantially as herein described.

8. The combination of a hollow pillow-block, a hollow shaft mounted to rotate in said pillow-block, an antifriction-bearing between said hollow shaft and said pillow-block, a driving-axle extending through said hollow shaft, a clearance between said driving-axle and said hollow shaft permitting eccentric motion of said driving-axle within said hollow shaft, a dog mounted upon or forming a part of said driving-axle and adapted to engage said hollow shaft and one or more springs interposed between said dog and the point of engagement of said dog with said hollow shaft whereby the rotation of the said driving-axle is communicated through said dog and said springs to said hollow shaft, substantially as herein described.

9. The combination of a dynamo, an armature-shaft thereof, a hollow pillow-block connected to or forming a part of said dynamo, a hollow shaft mounted to rotate in said pillow-block, suitable means for communicating the rotation of said hollow shaft to said armature-shaft, a driving-axle extending through said hollow shaft, a clearance between said driving-axle and said hollow shaft permitting eccentric motion of said driving-axle within said hollow shaft, a dog mounted upon or forming a part of said driving-axle and adapted to engage said hollow shaft whereby the rotation of said driving-axle is communicated through said dog to said hollow shaft and thence to said armature-shaft of said dynamo substantially as herein described.

10. The combination of a dynamo, an armature-shaft thereof, a hollow pillow-block connected to or forming a part of said dynamo, a hollow shaft mounted to rotate in said pillow-block, suitable means for communicating the rotation of said hollow shaft to said armature-shaft, an antifriction-bearing between said hollow shaft and said pillow-block, a driving-axle extending through said hollow shaft, a clearance between said driving-axle and said hollow shaft for permitting eccentric motion of said driving-axle within said hollow shaft, a dog mounted upon or forming a part of said driving-axle and adapted to engage said hollow shaft, whereby the rotation of said driving-axle is communicated through said hollow shaft and thence to said armature-shaft of said dynamo substantially as herein described.

11. The combination of a dynamo, an armature-shaft thereof, a hollow pillow-block connected to or forming a part of said dynamo, a hollow shaft mounted to rotate in said pillow-block, suitable means for communicating the rotation of said hollow shaft to said armature-shaft, a driving-axle extending through said hollow shaft, a clearance between said driving-axle and said hollow shaft permitting eccentric motion of said driving-axle within said hollow shaft, a dog mounted upon or forming a part of said driving-axle and adapted to engage said hollow shaft and one or more springs interposed between said dog and the point of engagement of said dog with said hollow shaft, whereby the rotation of said driving-axle is communicated through said dog and said springs to said hollow shaft and thence to said armature-shaft of said dynamo, substantially as herein described.

12. The combination of a dynamo, an armature-shaft thereof, a hollow pillow-block connected to or forming a part of said dynamo, a hollow shaft mounted to rotate in said pillow-block, suitable means for communicating the rotation of said hollow shaft to said armature-shaft, an antifriction-bearing between said hollow shaft and said pillow-block, a driving-axle extending through said hollow shaft, a clearance between said driving-axle and said hollow shaft for permitting eccentric motion of said driving-axle within said hollow shaft, a dog mounted upon or forming a part of said driving-axle and adapted to engage said hollow shaft and one or more springs interposed between said dog and the point of engagement of said dog with said hollow shaft, whereby the rotation of said driving-axle is communicated through said dog and said springs to said hollow shaft and thence to said armature-shaft of said dynamo, substantially as herein described.

Signed at New York, in the county of New York and State of New York, this 8th day of February, A. D. 1898.

WILLIAM LORD BLISS.

Witnesses:
   JOHN BLISS,
   JOHN L. BLISS.